United States Patent
Mitsumoto

(10) Patent No.: US 11,551,339 B2
(45) Date of Patent: Jan. 10, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shinichi Mitsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 16/932,553

(22) Filed: Jul. 17, 2020

(65) Prior Publication Data

US 2021/0027450 A1  Jan. 28, 2021

(30) Foreign Application Priority Data

Jul. 22, 2019 (JP) .............................. JP2019-134498

(51) Int. Cl.
*G06T 7/00* (2017.01)
*G06N 20/00* (2019.01)
*G06T 5/50* (2006.01)

(52) U.S. Cl.
CPC ........... *G06T 7/0002* (2013.01); *G06N 20/00* (2019.01); *G06T 5/50* (2013.01); *G06T 2207/20081* (2013.01)

(58) Field of Classification Search
CPC ........... G06T 7/30; G06T 7/0004; G06T 5/50; G06N 20/00; G06N 3/08

USPC ......................................................... 382/100
See application file for complete search history.

(56) References Cited

U.S. PATENT DOCUMENTS

| | | | | |
|---|---|---|---|---|
| 10,237,525 | B2 * | 3/2019 | Kanda | H04N 9/68 |
| 2011/0008017 | A1 * | 1/2011 | Gausereide | H04N 5/272 |
| | | | | 386/280 |
| 2012/0065944 | A1 * | 3/2012 | Nielsen | G06Q 50/06 |
| | | | | 703/1 |
| 2013/0328908 | A1 * | 12/2013 | Sundbom | G09G 5/06 |
| | | | | 345/592 |
| 2015/0363085 | A1 * | 12/2015 | Spjuth | G06T 11/60 |
| | | | | 715/810 |
| 2016/0027210 | A1 * | 1/2016 | The | G06T 19/006 |
| | | | | 345/633 |
| 2019/0012990 | A1 * | 1/2019 | Kim | G09G 5/363 |
| 2020/0351449 | A1 * | 11/2020 | Oh | H04N 13/178 |
| 2021/0166354 | A1 * | 6/2021 | Veit | G06V 10/56 |

FOREIGN PATENT DOCUMENTS

JP  2019-36885 A  3/2019

* cited by examiner

*Primary Examiner* — Congvan Tran
(74) *Attorney, Agent, or Firm* — Canon U.S.A., Inc. IP Division

(57) ABSTRACT

An information processing apparatus includes at least one processor configured to execute, composition processing of combining a first image and another image, and image processing on a second image generated through the composition processing, using metadata of the first image and metadata of the second image.

16 Claims, 9 Drawing Sheets

FIG.3

| | | 301 |
|---|---|---|
| POSITION DIVISION NUMBER | | HORIZONTAL: 6, VERTICAL: 3 |
| IMAGE CAPTURING ID: 0 | IMAGE CAPTURING POSITION | X: 0, Y: 0 |
| | FILE NAME | C:\Data1\IMG_001.jpg |
| | IMAGE SIZE | 4000 × 3000 |
| | IMAGE CAPTURING TIME | 2019/01/23 10:20:30 |
| | F-NUMBER | F8 |
| | SHUTTER SPEED | 1/50 |
| IMAGE CAPTURING ID: 1 | IMAGE CAPTURING POSITION | X: 0, Y: 0 |
| | FILE NAME | C:\Data1\IMG_002.jpg |
| | IMAGE SIZE | 4000 × 3000 |
| | IMAGE CAPTURING TIME | 2019/01/23 10:20:31 |
| | F-NUMBER | F16 |
| | SHUTTER SPEED | 1/50 |
| IMAGE CAPTURING ID: 2 | IMAGE CAPTURING POSITION | X: 1, Y: 0 |
| | FILE NAME | C:\Data1\IMG_003.jpg |
| | IMAGE SIZE | 4000 × 3000 |
| | IMAGE CAPTURING TIME | 2019/01/23 10:20:32 |
| | F-NUMBER | F8 |
| | SHUTTER SPEED | 1/50 |

FIG.4A 401

| COMPOSITE IMAGE SIZE | | 20000 × 8000 |
|---|---|---|
| COMPOSITION IMAGE NUMBER | | 18 |
| COMPOSITE RATIO | | NO BLENDING |
| COMPOSITION ID: 0 | FILE NAME | C:\Data1\IMG_001.jpg |
| | COMPOSITE IMAGE AREA | ((0, 0), (3600, 2800)) |
| | USED IMAGE-CAPTURING AREA | ((200, 100), (3800, 2900)) |
| COMPOSITION ID: 1 | FILE NAME | C:\Data1\IMG_003.jpg |
| | COMPOSITE IMAGE AREA | ((3600, 0), (6800, 2800)) |
| | USED IMAGE-CAPTURING AREA | ((400, 100), (3600, 2900)) |
| COMPOSITION ID: 2 | FILE NAME | C:\Data1\IMG_006.jpg |
| | COMPOSITE IMAGE AREA | ((6800, 0), (10000, 2800)) |
| | USED IMAGE-CAPTURING AREA | ((400, 100), (3600, 2900)) |

| IMAGE SIZE | 22000 × 8000 |
|---|---|
| TRANSFORMATION FORMULA | aX + bY + cZ |

FIG.4C 403

| DETECTION PARAMETER | MODEL A |
|---|---|
| CRACK ID ID1 | ((20, 25), (40, 50), 1) |
| CRACK ID ID2 | ((40, 50), (55, 60), 1) |
| CRACK ID ID3 | ((25, 45), (35, 75), 2) |

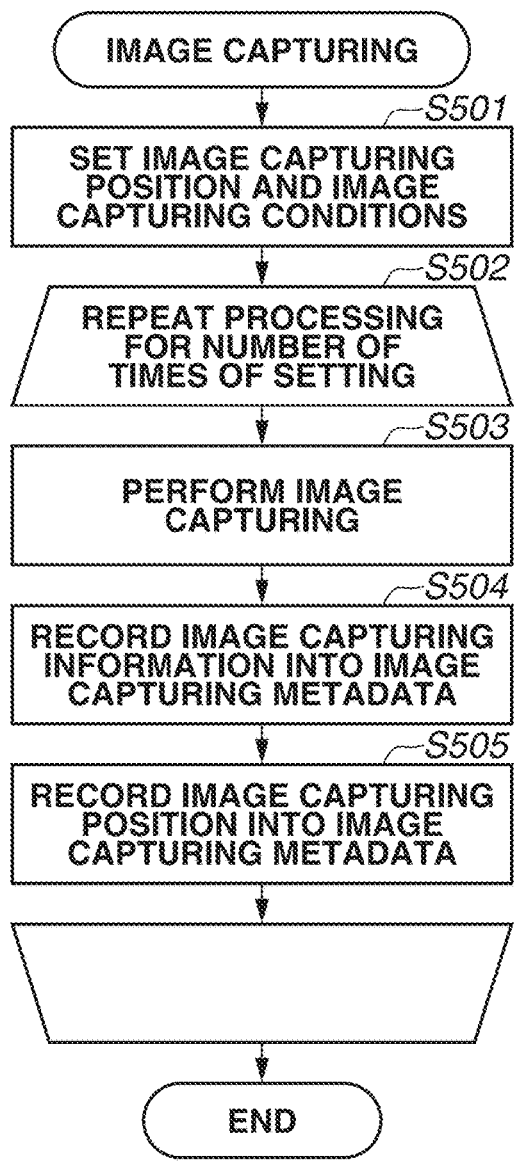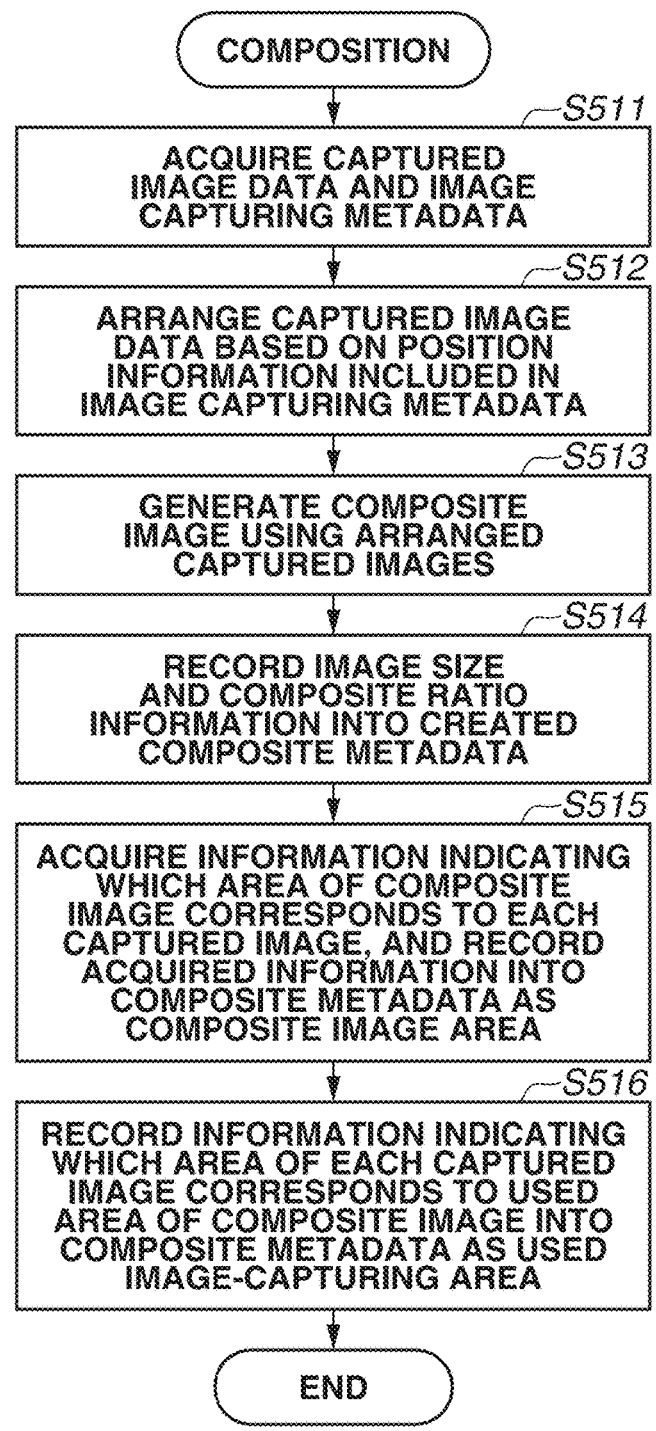

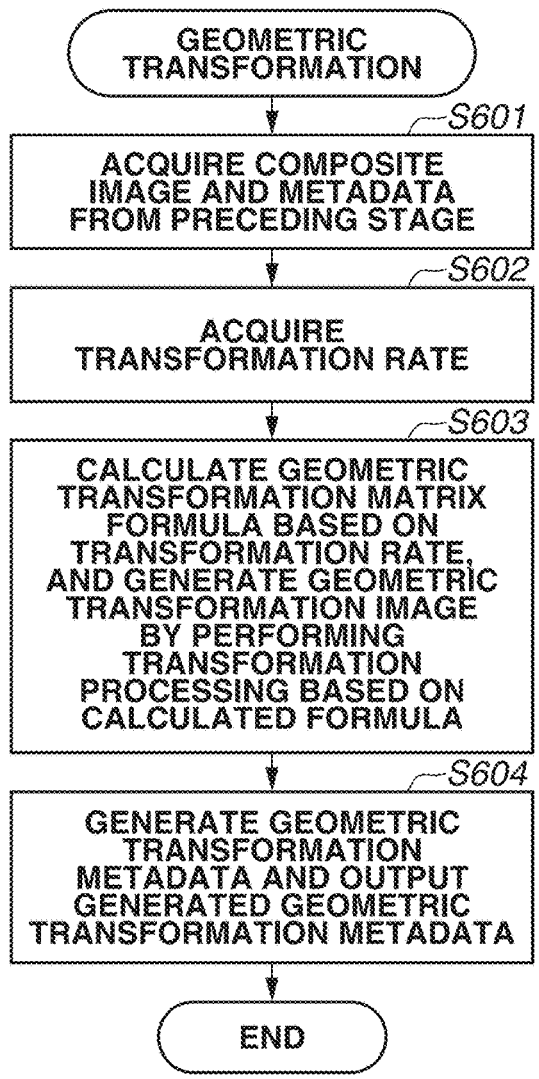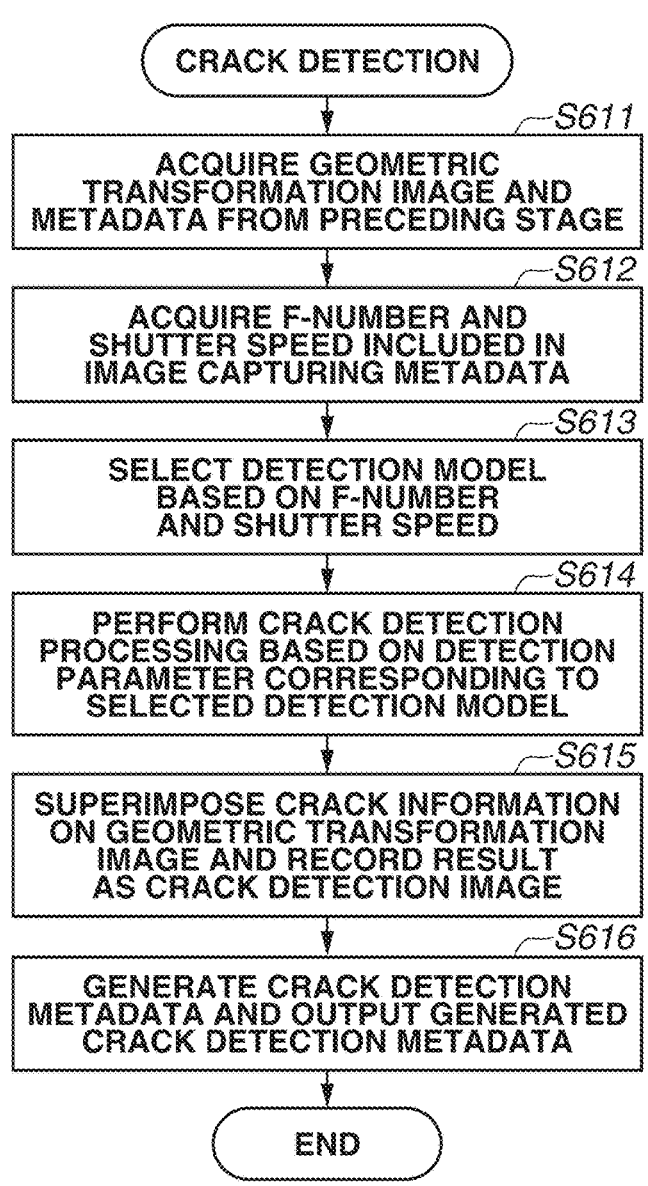

INFORMATION PROCESSING APPARATUS, INFORMATION PROCESSING METHOD, AND STORAGE MEDIUM

BACKGROUND OF THE INVENTION

Field of the Invention

The aspect of the embodiments relates to a technique for performing a plurality of types of image processing on an image in stages.

Description of the Related Art

In image processing, setting information used at the time of image capturing and information about image processing in a preceding stage (these are hereinafter referred to as metadata) other than an input image are useful.

Japanese Patent Application Laid-Open No. 2019-36885 discusses a technique for calculating metadata to be appended to a high-dynamic-range (HDR) composite image, from metadata of a plurality of captured images used in HDR composition, when the plurality of captured images is subjected to the HDR composition. The metadata held by the HDR image can be thereby used when the HDR image is referred to or processed.

There is a case where a captured image is subjected to different types of image processing with a plurality of different types of image processing being linked. In composition processing among the different types of image processing, at least a part of metadata of a pre-composition image is often lost after the composition processing due to deletion or overwriting when the number of images is decreased. However, in a case where the different types of image processing are lined and performed, it may be desirable to be able to reuse or refer to not only metadata used in the immediately preceding stage but also metadata used in the past image processing. There has been no established conventional technique for managing metadata to be used for each type of processing in a case where image processing including composition processing is performed with a plurality of stages being linked.

SUMMARY OF THE INVENTION

According to an aspect of the embodiments, an information processing apparatus includes at least one processor configured to execute composition processing of combining a first image and another image, and image processing on a second image generated through the composition processing, using metadata of the first image and metadata of the second image.

Further features of the disclosure will become apparent from the following description of exemplary embodiments with reference to the attached drawings.

BRIEF DESCRIPTION OF THE DRAWINGS

FIG. 3 is a diagram illustrating an example of a table storing metadata.

FIGS. 4A, 4B, and 4C are diagrams each illustrating an example of a table storing metadata.

FIGS. 5A and 5B are a flowchart illustrating an example of image capturing processing and a flowchart illustrating an example of composition processing, respectively.

FIGS. 6A and 6B are a flowchart illustrating an example of geometric transformation processing and a flowchart illustrating an example of crack detection processing, respectively.

DESCRIPTION OF THE EMBODIMENTS

Exemplary embodiments according to the disclosure will be described in detail below with reference to the accompanying drawings. Configurations to be described in the following exemplary embodiments are representative examples, and the scope of the disclosure is not necessarily limited to those specific configurations.

In the exemplary embodiments to be described below, in a case where a plurality of types of image processing including composition processing is sequentially performed on one or more target images, metadata usable in each type of processing is appropriately managed.

A first exemplary embodiment of the disclosure will be described below. In recent years, there has been an increasing demand for a technique for conducting an inspecting using an image of an object captured by a camera, in checkup work for social infrastructure including a tunnel, a bridge, and other large-scale structures. To inspect a structure included in the social infrastructure on a captured image, it is required to provide a captured image in a high-resolution to an extent that the state of a deformation (e.g., a crack) on the structure can be recognized from the captured image. However, because the size of a structure included in the social infrastructure is large, it is required that a single structure is divisionally image-captured through multiple times of image capturing, in order to obtain a high-resolution image of the structure. Thus, to perform an inspection using the plurality of divisionally captured images associated with the single structure, a plurality of types of image processing including composition processing is performed in stages, for example, in such a manner that divisional image-capturing is performed in a controlled manner, a composite image is generated by combining the captured images, and the composite image is adjusted. In an example to be described below in the present exemplary embodiment, a plurality of types of image processing is executed in a system of inspecting a structure for a deformation on the structure using an image, and metadata to be used in the image processing in each stage is managed.

Figure 1A:
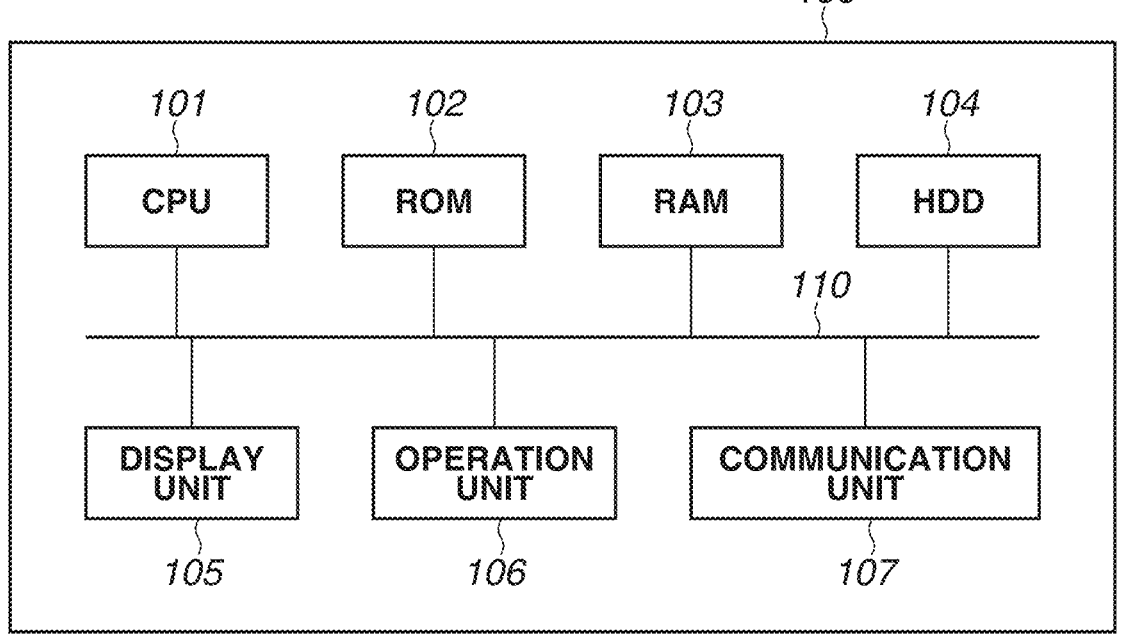
FIGS. 1A and 1B are diagrams each illustrating an example of a hardware configuration of an information processing apparatus.

FIG. 1A illustrates a hardware configuration of an information processing apparatus 100 according to the present exemplary embodiment. As illustrated in FIG. 1A, the information processing apparatus 100 includes a central processing unit (CPU) 101, a read-only memory (ROM) 102, a random access memory (RAM) 103, a hard disk drive (HDD) 104, a display unit 105, an operation unit 106, and a communication unit 107. The CPU 101 performs computation and logical determination for various types of processing, and controls each component connected to a system bus 110. The ROM 102 is used as a program memory, and stores a program for control by the CPU 101 including various processing procedures to be described below. The RAM 103 is used as a temporary storage area, such as a main memory and a work area for the CPU 101. The program memory may be implemented by the CPU 101 loading a program from an external storage device connected to the information processing apparatus 100 into the RAM 103.

The HDD 104 stores electronic data and a program according to the present exemplary embodiment. An external storage device may be used as a device playing a similar role. The external storage device can be implemented by, for example, a medium (a recording medium) and an external storage drive for access to this medium. Known examples of such a medium include a flexible disk (FD), a compact disc read-only memory (CD-ROM), a digital versatile disc (DVD), a Universal Serial Bus (USB) memory, a magneto-optical (MO) disc, and a flash memory. The external storage device may be a server apparatus connected by a network.

The display unit 105 is a device that outputs an image on a display screen. Examples of the display unit 105 include a cathode-ray tube (CRT) display and a liquid crystal display. The display unit 105 may be an external device connected to the information processing apparatus 100 by wire or wirelessly. The operation unit 106 includes a keyboard and a mouse, and receives various operations performed by a user. The communication unit 107 performs wired or wireless interactive communications with other information processing apparatuses, communication apparatuses, and external storage devices, based on a known communication technique.

Figure 1B:
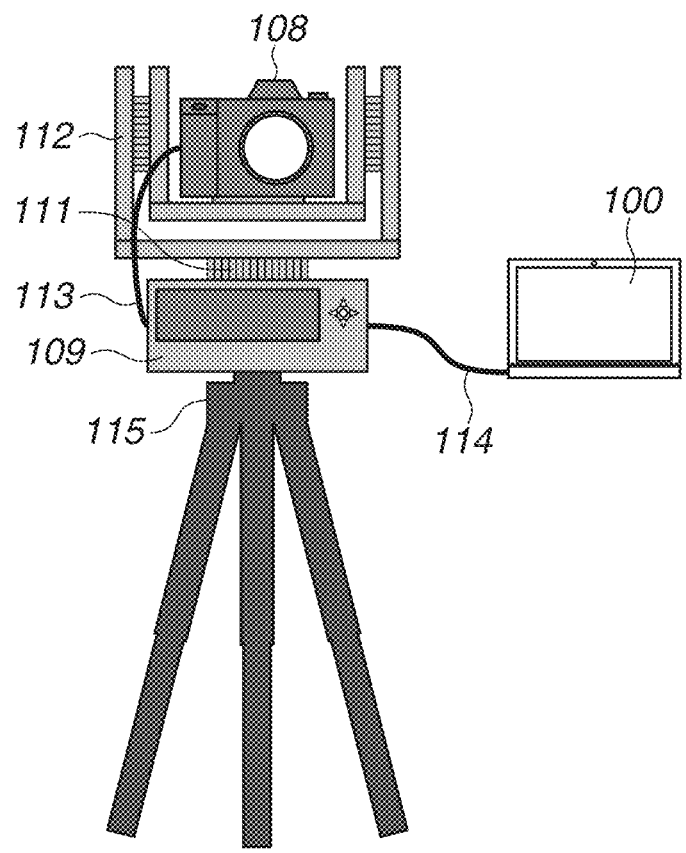

FIG. 1B is a diagram illustrating an example of a configuration of an image capturing system including the information processing apparatus 100. In FIG. 1A, an imaging apparatus 108 is installed on a pan head apparatus 109 and fixed by a tripod 115. The imaging apparatus 108 has an image capturing function, and converts an image captured via a lens (not illustrated) into data based on an instruction of the CPU 101. A drive unit 111 and a drive unit 112 of the pan head apparatus 109 drive the pan head apparatus 109 in a pan direction and a tilt direction, respectively. The imaging apparatus 108 is connected to the pan head apparatus 109 by a communication cable 113. In image capturing processing, the information processing apparatus 100 serves as a control apparatus of the image capturing system, and transmits an instruction signal for controlling an image capturing direction to the pan head apparatus 109. Here, the information processing apparatus 100 includes a display and an input device (including a keyboard and a pointing device) as the operation unit 106. In FIG. 1B, the pan head apparatus 109 is connected to the information processing apparatus 100 by a communication cable 114, but may be connected by a wireless network. In the present exemplary embodiment, the information processing apparatus 100 is a laptop computer, but may be a portable apparatus, such as a tablet personal computer (PC), or may be a large PC or a server apparatus whose installation position is fixed. In FIG. 1B, the imaging apparatus 108 and the pan head apparatus 109 are each an external apparatus connected to the information processing apparatus 100, but may be integral with the information processing apparatus 100.

Data representing an image captured by the imaging apparatus 108 is acquired by the information processing apparatus 100 via the communication unit 107, and handled as a target image to be subjected to image processing. For the communication between the imaging apparatus 108 and the information processing apparatus 100, a conventional technique can be used regardless of whether the communication is wired or wireless. For example, an image recorded in any of various mediums, such as a secure digital (SD) card in the imaging apparatus 108 may be acquired via a slot of the information processing apparatus 100. The target image may be acquired from the imaging apparatus 108 in such a manner that the imaging apparatus 108 uploads an image to the cloud through a wireless communication technique and the uploaded image is downloaded by the information processing apparatus 100. In such a case, the information processing apparatus 100 that performs image processing in a subsequent operations to be described below may not be installed at an image capturing location at the time when the imaging apparatus 108 captures the image.

Figure 2:
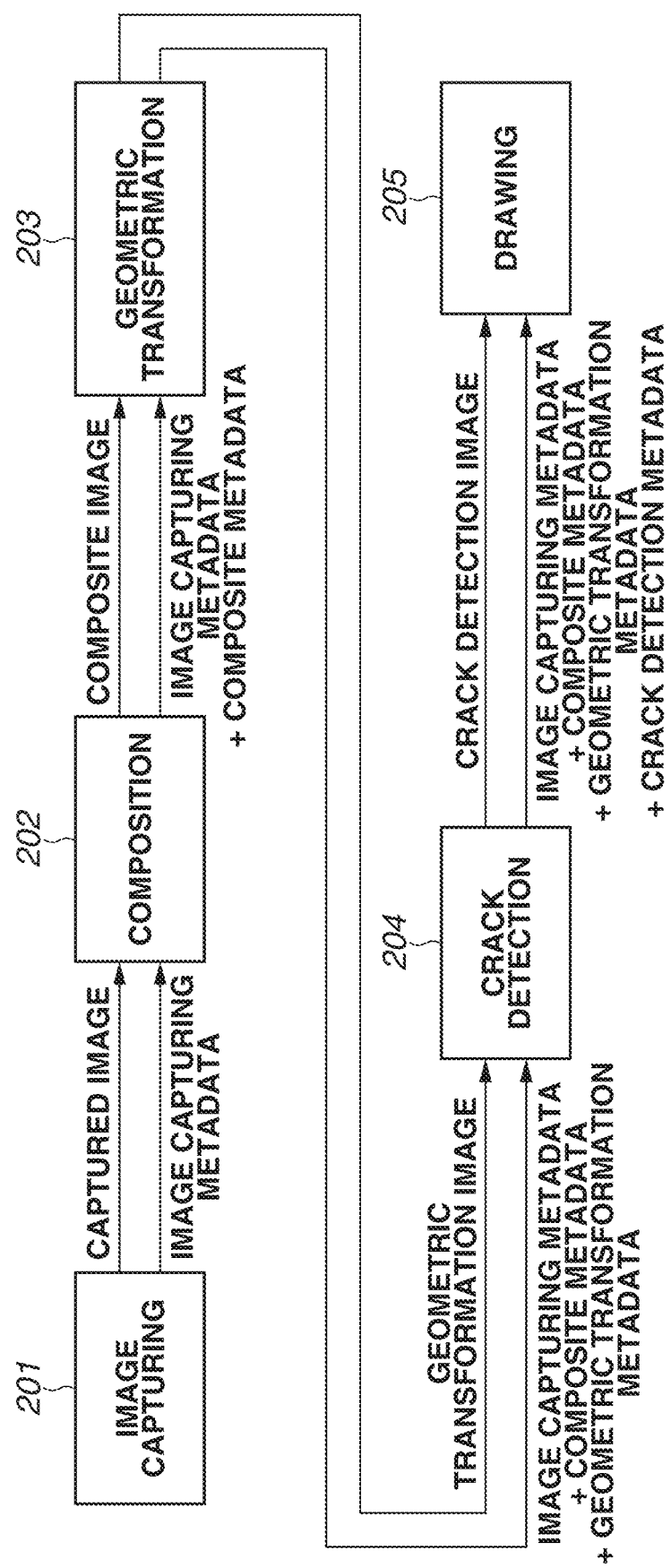
FIG. 2 is a conceptual diagram illustrating an example of a state where different types of image processing are executed with a plurality of stages being linked.

FIG. 2 is a conceptual diagram illustrating a state where a plurality of types of image processing is executed with a plurality of stages being linked in the present exemplary embodiment. In each of the plurality of types of image processing, a first image that is a result of executing image processing up to a preceding stage on a processing target image and first metadata generated in the image processing up to the preceding stage are acquired as input. A second image that is a result of executing predetermined image processing on the first image, second metadata generated in the predetermined image processing, and the first metadata are input in image processing in a subsequent stage. In each processing block, the CPU 101 serves as an image processing unit or a metadata generation unit, by loading the program stored in the ROM 102 into the RAM 103 and executing processing based on each flowchart to be described below. An execution result of each type of processing is held in the RAM 103. In the image processing, the execution result is an image (the second image) that is a result of performing image processing on an input image (the first image), and metadata (the second metadata). In the present exemplary embodiment, the execution results of the respective types of image processing are saved into the HDD 104. To enable these execution results to be referenced in the image processing in the subsequent stage, at least referent information is communicated to the subsequent stage. In the present exemplary embodiment, in addition to direct transmission of an image processing result from the image processing in the preceding stage to the image processing in the subsequent stage, transmission of the referent information about the image processing result will be referred to as outputting the image processing result.

In a case where, for example, a hardware configuration is employed as an alternative to software processing using the CPU 101, a computation unit or a circuit corresponding to the processing of each of the blocks described herein may be configured.

An image capturing processing block 201 acquires image data representing images of segmented portions of a structure captured through the control of the imaging apparatus 108 and the pan head apparatus 109, and outputs the acquired image data to the subsequent stage, and also outputs image capturing metadata. The image capturing metadata will be described in detail below with reference to FIG. 3. A composition processing block 202 acquires the image data and the image capturing metadata from the image capturing processing block 201 as input, combines the plurality of images into one image, and outputs the resultant. The composition processing block 202 also outputs composite metadata, in addition to the image capturing metadata acquired from the image capturing processing block 201. The composite metadata will be described in detail below with reference to FIG. 4A. In composition processing, a plurality of captured images is combined to be generated as one composite image in new data format. For example, when a plurality of captured images in Joint Photographic Experts Group (JPEG) format is combined, a resultant composite image has a large image size (width× height), and thus, the data format changes to Targeted Image File Format (TIFF) for handling a larger image size. In typical image composition, image capturing information (e.g., an image capturing time) held by the original image can be lost due to deletion or overwriting when new image data is generated through the composition processing. However, in the present exemplary embodiment, such image capturing information is saved as the image capturing metadata and the saved image capturing metadata is communicated to the processing in the subsequent stage. A geometric transformation processing block 203 acquires the composite image data and the composite metadata from the composition processing block 202 as input, performs geometric transformation processing using the input, and outputs a post-transformation image as geometric transformation image data. The geometric transformation processing block 203 also outputs geometric transformation metadata, in addition to the metadata acquired from the composition processing block 202. The geometric transformation metadata will be described in detail below with reference to FIG. 4B.

A crack detection processing block 204 acquires the geometric transformation image data and geometric transformation metadata from the geometric transformation processing block 203 as input, and performs crack detection processing using the input. In the present exemplary embodiment, the crack detection processing indicates processing of detecting a crack occurring on a surface of the structure appearing in the image. The crack detection processing block 204 also outputs a crack detection image in which the detected crack is superimposed on at least a part of the image generated in the geometric transformation processing block 203. The crack detection processing block 204 also outputs crack detection metadata, in addition to the metadata acquired from the geometric transformation processing block 203. The crack detection metadata will be described in detail below with reference to FIG. 4C. A drawing processing block 205 acquires the crack detection image and the metadata from the crack detection processing block 204 as input, superimposes the crack detection image on the corresponding coordinates of the drawing of the structure, and outputs a resultant image. In the present exemplary embodiment, image processing of affixing or superimposing a captured image of a structure onto the corresponding position in the design drawing of the same structure will be referred to below as "drawing processing".

FIG. 3 illustrates a table 301 representing the image capturing metadata (hereinafter may be referred to as the image capturing metadata 301) generated in the image capturing processing block 201. The table 301 includes the combination of information representing a position division number and an information set identified with an image capturing identification (ID). The image capturing ID is a number assigned to uniquely identify the information set, and each of the information sets includes information indicating each of an image capturing position, a file name, an image size, an image capturing time, an f-number, and a shutter speed. The image capturing IDs correspond to the respective captured image files. The position division number represents the number of divisions in each of a horizontal direction and a vertical direction in a case where the information processing apparatus 100 captures images while changing the image capturing direction by controlling the pan head apparatus 109 (i.e., the number of image capturing positions). The image capturing position represents the number of a position at which the image is captured in each of an X-direction and a Y-direction among the positions corresponding to the divisions. The file name describes the file name of the captured image, including the folder name of a saving destination thereof. The image size (width× height), the image capturing time, the f-number, and the shutter speed each represent the image capturing information obtained at the time of image capturing. As represented by the image capturing IDs 0 and 1, those having the same image capturing position indicate that a plurality of images are captured at the same position with the f-number or the shutter speed changed.

FIG. 4A illustrates a table 401 representing the composite metadata generated in the composition processing block 202 (hereinafter may be referred to as the composite metadata 401). The table 401 includes a composite image size, a composition image number, a composite ratio, and an information set identified by a composition ID. The composite image size represents the image size (width×height) of a composite image, and the composition image number represents the number of images used in composition. The composite ratio represents information indicating whether to use blending of causing adjacent images to have an overlap area, adding the overlap area thereto, and calculating an average value, in the composition processing. The blending has an advantage that the boundary between the images becomes less noticeable, but has a disadvantage that sharpness declines because images are processed. The composition ID is a number assigned to uniquely identify the information set, and each of the information sets includes a file name, a composite image area, and a used image-capturing area, of each of the captured images used in the composition. The file name indicates that the captured images having the same file name within the image capturing metadata are used in the composition.

The composite image area represents a rectangular area of the image of the file name, in the composite image, and indicates the coordinates of the upper-left corner and the coordinates of the lower-right corner of the rectangle. The used image-capturing area represents a rectangular area used within the captured image, and indicates the coordinates of the upper-left corner and the coordinates of the lower-right corner of the rectangle. The composite image area and the used image-capturing area are not limited to the rectangle, and may be of any other shape if the area can be designated.

FIG. 4B illustrates a table 402 representing the geometric transformation metadata generated in the geometric transformation processing block 203 (hereinafter may be referred to as the geometric transformation metadata 402). The table 402 includes an image size and a transformation formula. The image size represents an output image size after the geometric transformation processing. The transformation formula represents a transformation matrix used in the geometric transformation processing.

FIG. 4C illustrates a table 403 representing the crack detection metadata generated in the crack detection processing block 204 (hereinafter may be referred to as the crack detection metadata 403). The table 403 includes a detection parameter and a crack ID. The detection parameter is a parameter to be used for the crack detection processing, and represents a used model among a plurality of models. The performance of the crack detection processing varies depending on image capturing conditions, and therefore, the plurality of models each corresponding to the f-number and the shutter speed included in the captured image are stored in the HDD 104. The crack ID represents line segment information about each crack detected in the crack detection processing, and indicates coordinate information representing the start point of a line segment, coordinate information representing the end point of the line segment, and the thickness of the line segment.

FIG. 5A is a flowchart illustrating an example of processing which is executed in the image capturing processing block 201 of the present exemplary embodiment. Each process (step) in the flowchart is provided with a reference numeral having a prefix S, and will be described below.

In step S501, the CPU 101 serving as the image processing unit acquires the position division number and the image capturing conditions from the image capturing metadata 301, and generates information to be set in the pan head apparatus 109 and the imaging apparatus 108. Here, the CPU 101 sets the number of times of image capturing, and the position for controlling platform. In step S502, the CPU 101 increments the image capturing ID from 0, each time operations in step S503 to step S505 (described below) that are processing of controlling image capturing and platform are repeated, based on the information set in step S501. In step S503, the CPU 101 notifies an image capturing instruction to the imaging apparatus 108. The CPU 101, serving as an image acquisition unit, acquires the image data representing an image captured based on the image capturing instruction from the imaging apparatus 108, and records the acquired image data into the HDD 104 as a file. The CPU 101 then adds a record of the image capturing ID to the image capturing metadata 301 on the HDD 104 and records the file name. In step S504, the CPU 101 records the image capturing information obtained when the image is captured in step S503, into the record of the image capturing ID in the image capturing metadata 301. The image capturing information here includes the image capturing time, the f-number, and the shutter speed.

In step S505, the CPU 101 records position information (the image capturing position) corresponding to the image capturing direction set in the pan head apparatus 109, into the image capturing metadata.

This ends the flow of the processing executed in the image capturing processing block 201 in the present exemplary embodiment. The present exemplary embodiment illustrates an example where the setting information generation in step S501 and the actual image capturing in step S503 to step S505 are performed in one flow. However, for example, step S501 may be executed beforehand as preprocessing, and at an image capturing location, stored setting conditions may be read out and image capturing may be performed based on the read-out setting conditions.

FIG. 5B is a flowchart illustrating an example of processing which is executed in the composition processing block 202 of the present exemplary embodiment. In step S511, the CPU 101 serving as the image processing unit acquires the captured image data and the image capturing metadata output from the image capturing processing block 201 and recorded in the HDD 104. In the present exemplary embodiment, the CPU 101 reads out the data from the table 301. In step S512, the CPU 101 arranges the captured image data based on the position information included in the image capturing metadata acquired in step S511. In step S513, the CPU 101 generates the composite image using the arranged captured images and records the generated composite image into the HDD 104. A typical method may be used for the processing of generating the composite image, and in this processing, the adjacent images are aligned, and the composite image is generated by the images being stitched using information representing aligned areas.

In step S514, the CPU 101 acquires the image size (width×height) of the composite image and the composite ratio information used in the composition, and records the acquired image size and composite ratio information into the composite metadata 401 created on the HDD 104. In step S515, the CPU 101 acquires information indicating which area of the composite image corresponds to each of the captured images used for the composition processing, and records the acquired information into the composite metadata, as the composite image area. For the method for acquiring such area information, typical image alignment processing or similar image area processing may be used. In step S516, the CPU 101 records area in the captured image corresponds to the used area of the composite image, into the composite metadata, as the used image-capturing area. This ends the flow of the processing executed in the composition processing block 202 in the present exemplary embodiment.

FIG. 6A is a flowchart illustrating an example of processing which is executed in the geometric transformation processing block 203 according to the present exemplary embodiment. In step S601, the CPU 101 serving as the image processing unit acquires the composite image data and the composite metadata output from the composition processing block 202 and recorded in the HDD 104, as well as the image capturing metadata. In the present exemplary embodiment, the CPU 101 reads out the data from each of the table 301 and the table 401. In step S602, the CPU 101 acquires a transformation rate from a shape to be subjected to the geometric transformation. The shape to be transformed is designated in a user interface (UI) screen displayed on the display unit 105 as illustrated in FIG. 8.

Figure 8:
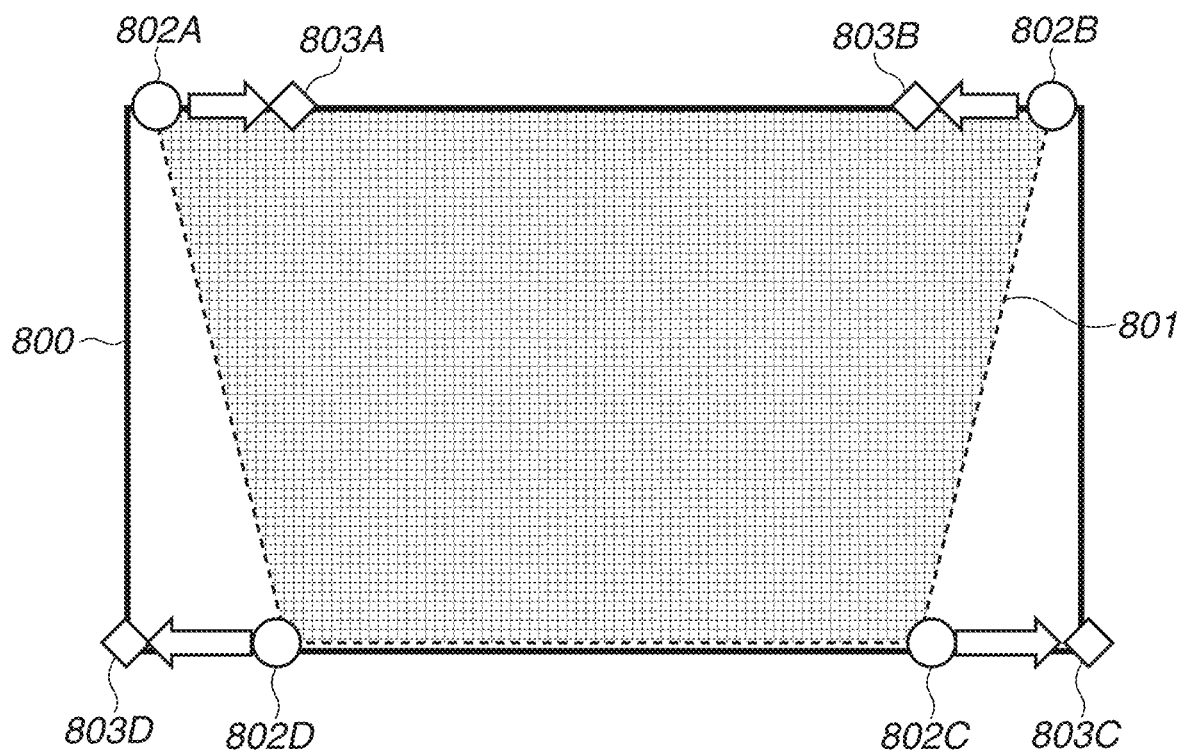
FIG. 8 is a diagram illustrating an example of a user interface to be presented to a user in the geometric transformation processing.

FIG. 8 is a diagram illustrating an example of the UI screen displayed on the display unit 105 during execution of the geometric transformation processing. The user designates reference points 802A to 802D of a target area 801 for the geometric transformation within a composite image 800, and further designates target points 803A to 803D for the transformation, using the operation unit 106. In the information processing apparatus 100 receiving the designation, the CPU 101 transforms a quadrangle formed by the reference points 802A to 802D into a quadrangle formed by the target points 803A to 803D, in step S602. This difference in shape is the transformation rate. The reference points and the target points are thus designated using the UI by the user, but instead feature points of an L-shape of a structure may be automatically detected in image recognition processing.

Referring back to the description of FIG. 6A, in step S603, the CPU 101 calculates the transformation formula (the transformation matrix) based on the transformation rate acquired in step S602, and generates the geometric transformation image by performing the transformation processing based on the calculated formula. In step S604, the CPU 101 creates the geometric transformation metadata 402 on the HDD 104. The CPU 101 records the image size of the image after the transformation and the transformation formula calculated in step S603, into the created geometric transformation metadata 402. This ends the flow of the processing executed in the geometric transformation processing block 203 in the present exemplary embodiment.

FIG. 6B is a flowchart illustrating an example of processing which is executed in the crack detection processing block 204 according to the present exemplary embodiment. In step S611, the CPU 101 serving as the image processing unit acquires the geometric transformation image data output from the geometric transformation processing block 203 and recorded in the HDD 104, as well as the geometric transformation metadata, the composite metadata, and the image capturing metadata. In the present exemplary embodiment, the CPU 101 reads out the data from each of the table 301, the table 401, and the table 402. In step S612, the CPU 101 acquires the f-number and the shutter speed included in the image capturing metadata.

In step S613, the CPU 101 selects an optimum detection model from among the detection models recorded in the HDD 104, based on the f-number and the shutter speed acquired in step S612. The CPU 101 may switch the optimum detection model based on the composite ratio information acquired in step S514. In step S614, the CPU 101 performs the crack detection processing based on the detection parameter selected in step S613. For the crack detection processing, a typical image recognition technique may be used. Using a machine learning scheme, a crack area is trained, and the detection processing is performed using a trained model obtained thereby.

The CPU 101 may perform the crack detection processing, in corporation with a graphics processing unit (GPU, not illustrated). Further, for example, a process of prompting the user to designate the trained model may be added here, and the crack detection may be performed based on the designated trained model. In a case where the f-number and the shutter speed included in the image capturing information about the captured image are not uniform, i.e., the values thereof vary, the crack detection processing may be performed while the detection model is switched for each area of the captured image.

In step S615, the CPU 101 superimposes the crack information (the start point, the end point, and the thickness of a line segment) detected in step S614 on the geometric transformation image, and records the result into the HDD 104 as the crack detection image. In step S616, the CPU 101 creates the crack detection metadata 403 on the HDD 104, and records, in step S613, the detection parameter information and the detected crack information, into the created crack detection metadata 403. This ends the processing executed in the crack detection processing block 204 in the present exemplary embodiment.

Figure 7:
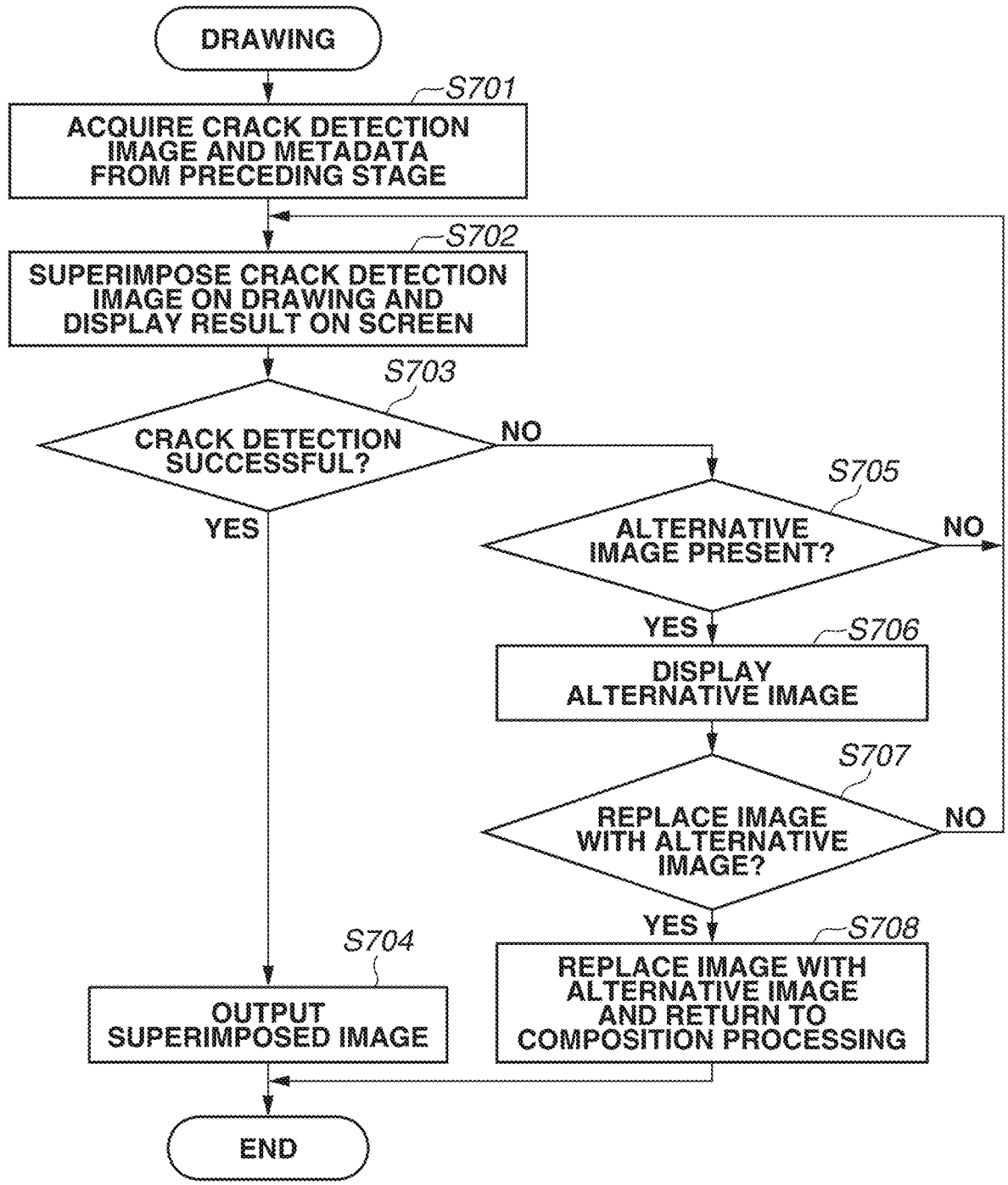
FIG. 7 is a flowchart illustrating an example of drawing processing.

FIG. 7 is a flowchart illustrating an example of processing which is executed in the drawing processing block 205 according to the present exemplary embodiment. In step S701, the CPU 101 serving as the image processing unit acquires the crack detection image output from the crack detection processing block 204 and recorded in the HDD 104, as well as the crack detection metadata, the geometric transformation metadata, the composite metadata, and the image capturing metadata. In the present exemplary embodiment, the CPU 101 reads out the data from each of the table 301, the table 401, the table 402, and the table 403.

Figure 9A:
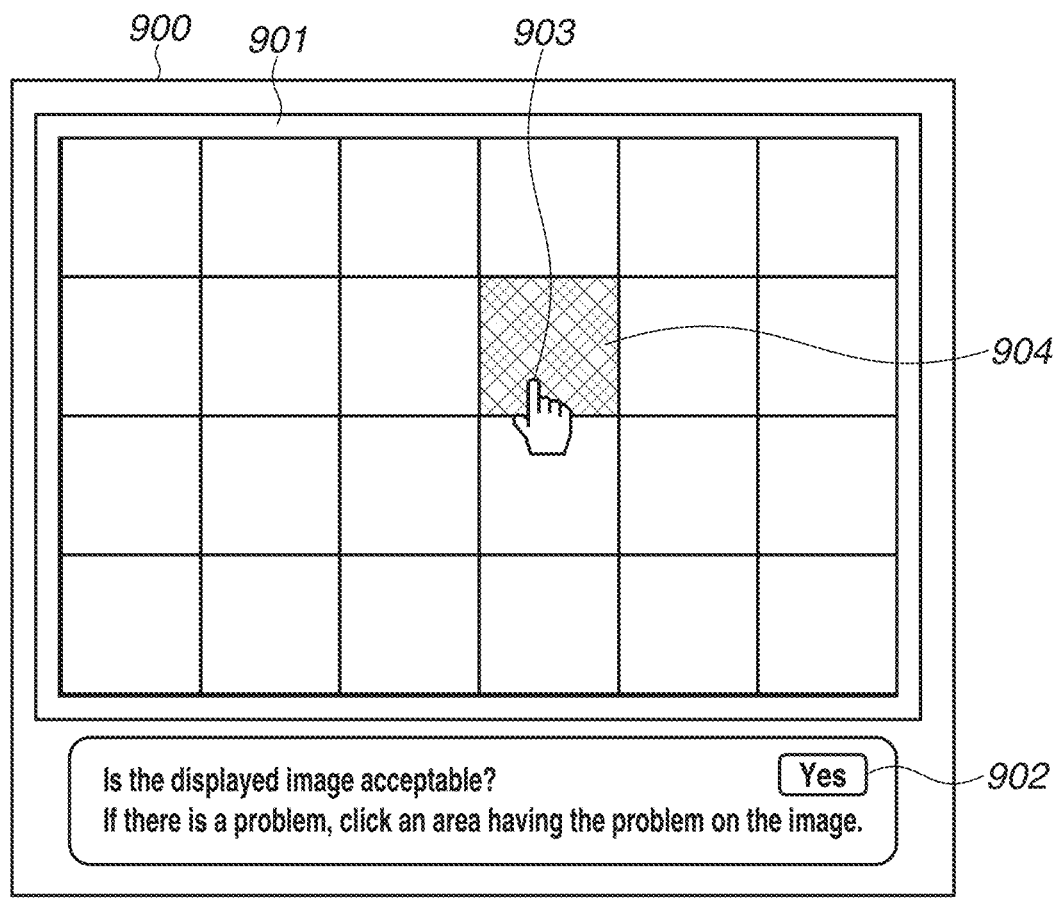
FIGS. 9A and 9B are diagrams each illustrating an example of a user interface to be presented to the user in the drawing processing.

In step S702, the CPU 101 acquires drawing data about an inspection target structure stored in the HDD 104, superimposes the crack detection image acquired in step S701 on the corresponding area in the drawing, and displays the result on a screen in the display unit 105 as illustrated in FIG. 9A. The drawing data about the structure is information indicating design information (e.g. precise dimensions) about the inspection target structure.

FIG. 9A is a diagram illustrating an example of a UI screen displayed on the display unit 105 during execution of the drawing processing. A display screen 900 represents an application window displayed on the display unit 105. An image 901 represents the image in which the crack detection image is superimposed on the drawing data about the structure. A lattice on the image 901 represents the unit of the original image used in the composition in the composition processing block 202. Each area segmented by the lattice corresponds to the composite image area. A button 902 is used for the user to operate (press) in a case where the user determines that the displayed image is acceptable after visually confirming whether the crack detection performed by the crack detection processing block 204 reaches the extent that a predetermined requirement is satisfied. A message is displayed with the button 902 to prompt the user to click an area in the image 901 in a case where the user determines that there is a problem.

In a case where the user determines that there is a problem as a result of the visual confirmation, a pointer 903 is used for the user to designate an area where the problem is present. A problem area 904 represents the area designated by the pointer 903. The "case where the user determines that the displayed image is acceptable" indicates that the detection of a crack included in the image is successful, and the "case where the user determines that there is a problem" indicates that the detection of a crack included in the image is unsuccessful. Examples of the cause of such unsuccessful detection include image blurring and appearance of an insect or tree.

Referring back to FIG. 7, in step S703, the CPU 101 determines whether the crack detection is successful, by determining whether the button 902 is pressed or the problem area 904 in the image is clicked, based on information notified by the operation unit 106. If the button 902 is pressed (YES step S703), the processing proceeds to step S704. If the problem area 904 is clicked (NO in step S703), the processing proceeds to step S705.

In step S704, the CPU 101 records the image generated by superimposing the crack detection image on the drawing in step S702 into the HDD 104. In step S705, the CPU 101 identifies the captured image file corresponding to the problem area 904, based on the information about the area designated as the problem area 904 in step S703, and the image capturing metadata as well as the composite metadata, and acquires the image capturing position. The CPU 101 then determines whether an alternative image captured at the acquired image capturing position is present among the images stored in the HDD 104. If the alternative image is present (YES in step S705), the processing proceeds to step S706. If the alternative image is not present (NO in step S705), the CPU 101 displays a notification indicating "no alternative image" (not illustrated), and the processing returns to step S702. The user, who has received the notification, can, for example, call the image capturing metadata about the problem area 904, and consider why the crack detection has not been appropriately performed. The user can thus address the issue by, for example, executing the crack detection again after changing the parameter or learning model, or performing image capturing again.

Figure 9B:
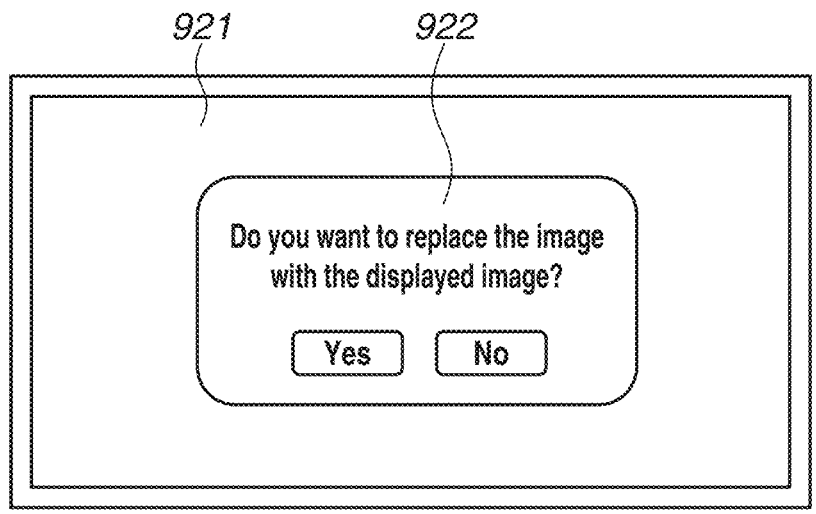

In step S706, the CPU 101 displays an alternative image 921 on the display unit 105 as illustrated in FIG. 9B. In step S707, the CPU 101 determines whether the image is to be replaced with the alternative image, by detecting an operation on (a press of) a Yes button or a No button in a replacement dialog 922 illustrated in FIG. 9B, based on information notified by the operation unit 106. If the Yes button is pressed, the CPU 101 determines that the image is to be replaced with the alternative image (YES in step S707), and the processing proceeds to step S708. If the No button is pressed, the CPU 101 determines that the image is not to be replaced with the alternative image (NO in step S707), and the processing returns to step S702. In step S708, the CPU 101 replaces the image with the image displayed in step S706, and the processing starting from the composition processing block 202 is performed again.

This ends the flow of the processing executed in the drawing processing block 205 described with reference to FIG. 7. In the present exemplary embodiment, the image processing performed immediately before the drawing processing is the crack detection processing. However, in a case where a problem occurs in a partial area in the crack detection processing, the user can address the problem or consider the cause of the problem, by referring to the information used in the image capturing processing and the composition processing performed earlier.

In the present exemplary embodiment, in the case where the user determines that "there is a problem" by visually confirming the crack detection result in step S703, the composition processing is performed again after the corresponding captured image is replaced based on the image capturing position. Alternatively, as a modification, the user may be enabled to address a degradation resulting from the image in the composition processing or the geometric transformation processing. In such a case, after the processing parameter for the composition processing or the geometric transformation processing is changed, the processing from that stage is performed again. In a case where the processing is performed again, an instruction concerning information to be used for redoing the processing is received from the user.

As described above, in the information processing apparatus 100 according to the present exemplary embodiment, when the plurality of different types of image processing is sequentially performed, the image data and the metadata generated in each type of image processing can be input to the image processing in the subsequent stage. In particular, because new metadata is generated in a state where the metadata in the preceding stage is maintained, the metadata generated up to the preceding stage can be obtained in each type of image processing. Therefore, in a plurality of types of image processing linked in various patterns, metadata obtained up to the preceding stage can also be used in the subsequent stage, without losing the obtained metadata. This prevents the sequence of the image processing from being limited due to concern about a loss of the metadata.

In particular, in multiple types of image processing which is executed on an image captured for the purpose of inspecting a structure included in social infrastructure, image capturing conditions and position information obtained at the time of image capturing may also be used in the processing in each of the subsequent stages (geometric transformation of an image, and crack detection). Moreover, in some cases, it may be desirable to review a parameter used in the preceding processing, in order to improve a result output from the processing in the subsequent stage. In such cases, the method for managing the metadata according to the present exemplary embodiment is suitably performed. For example, in a case where a structure is divisionally image-captured, the captured images can vary in contrast or color, if the f-number or shutter speed varies, or in areas corresponding to the image capturing positions away from each other. In such a case, it is recommended that the crack detection be performed using different detection models. According to the present exemplary embodiment, the information obtained during the image capturing which is the leading stage of the processing, can be referred to in the crack detection processing which is performed in the stage following the subsequent two or more stages, and therefore, the metadata can also be effectively used in selecting an appropriate detection model.

In the present exemplary embodiment, for the method for passing the metadata between a plurality types of image processing, a table is generated in each type of image processing and the generated table is recorded into the HDD 104, as described above. Alternatively, the table may be saved into the RAM 103 or an external recording area via the communication unit 107, instead of being recorded into the HDD 104. For another method for passing the metadata, the metadata may be embedded in the image data. Alternatively, information indicating the metadata may be added to the file name of the image data.

Application of the present exemplary embodiment is not limited to the pattern in which five image processing blocks are linked as illustrated in FIG. 2. For example, the image processing may start from the composition processing using the captured images as input, or start from the geometric transformation processing using the composite image as input, or start from the crack detection processing using the geometrically transformed image as input. In that case, because the processing begins in midstream, an item corresponding to lacking metadata may be input via a UI. For example, in a case where the image processing starts from the composition processing using the captured images as the input, the image capturing metadata 301 may be created using the image capturing information extracted from the captured images and the information indicating the image capturing position input via the UI.

As an example of the composition processing in the present exemplary embodiment, two-dimensional composition processing is described, but composition of superimposing another image as a layer may also be adopted.

A second exemplary embodiment of the disclosure will be described below. In the first exemplary embodiment, the plurality of image processing blocks illustrated in FIG. 2 is executed in the information processing apparatus 100 alone. According to the present exemplary embodiment, a configuration can be provided such that an information processing system includes a plurality of information processing apparatuses similar to the information processing apparatus 100. In this system, the plurality of information processing apparatuses is each connected by a communication in a network to one another and executes the processing in each of FIG. 5A to FIG. 7. In such a case, except for the apparatus that executes the image capturing processing (the flow in FIG. 5A), the apparatuses may not be necessarily connected to the imaging apparatus 108 and the pan head apparatus 109.

In the first exemplary embodiment, the image data and the metadata transmitted between the blocks illustrated in FIG. 2 are recorded in the HDD 104 and read out in the image processing in the subsequent stage. In the second exemplary embodiment, the image data and the metadata are communicated from the apparatus in charge of the processing in the block of the preceding stage to the apparatus in charge of the processing of the next block, via the communication unit 107. For example, the image capturing metadata 301 and the composite metadata 401 are transmitted together with the composite image, from the apparatus in charge of the composition processing block 202 to the apparatus in charge of the geometric transformation processing block 203. The image capturing metadata, the composite metadata, the geometric transformation metadata, and the crack detection metadata are transmitted together with the crack detection image, from the apparatus in charge of the crack detection processing block 204. Thus, the plurality of types of image processing can be sequentially executed, and the metadata according to the preceding image processing executed in another apparatus can be used or referred to by the apparatus that performs the processing in the subsequent stage. A single information processing apparatus may not be necessarily assigned to the processing in each of FIG. 5A to FIG. 7, and a single information processing apparatus may execute two or more processes as in the first exemplary embodiment.

As in the present exemplary embodiment, in a case where the series of processing blocks illustrated in FIG. 2 is shared and executed by the plurality of apparatuses, if the series of processing blocks is repeated while the target image is changed, it is possible to perform pipelining for each image processing block without waiting for completion of all the processing blocks. The effect of enabling high-speed execution of the overall processing can be thereby produced.

Other Embodiments

A trained model obtained through machine learning may be used as an alternative to each of the processing units for the composition processing, the geometric transformation processing, and the crack detection processing, among the above-described processing units. In such a case, for example, a plurality of combinations of input data and output data is prepared as training data, and a trained model that acquires knowledge from the training data through machine learning and outputs output data as a result of input data based on the acquired knowledge is generated. The trained model can be configured using, for example, a neural network model. The trained model performs the processing of the above-described processing unit, by operating with a device, such as a CPU or GPU, as a program for performing processing equivalent to the processing of the above-described processing unit. The above-described trained model may be updated as necessary after predetermined processing is performed.

The disclosure can also be implemented by supplying a program that implements one or more functions of each of the above-described exemplary embodiments to a system or apparatus via a network or storage medium, and causing one or more processors in a computer of the system or apparatus to read out the program and execute the read-out program. The disclosure can also be implemented by a circuit (e.g., an application-specific integrated circuit (ASIC)) for implementing the one or more functions.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-134498, filed Jul. 22, 2019, which is hereby incorporated by reference herein in its entirety.

What is claimed is:

1. An information processing apparatus for a system of inspecting a structure for a deformation on the structure using an image, the information apparatus comprising:
at least one processor configured to execute:
acquisition processing of acquiring a first image and another image, the first image and the other image being each an image of the structure captured by an imaging apparatus;
composition processing of combining the first image and the other image, and to generate a second image;
acquisition processing of acquiring information about image-capturing of the first image as metadata of the first image and information about image-capturing of the other image as metadata of the other image;
generation processing of generating metadata of the second image; and
image processing on the second image using the metadata of the first image and the metadata of the second image,
wherein the image processing includes detection processing of detecting the deformation on the structure from the image of the structure.

2. The information processing apparatus according to claim 1, wherein the image processing further includes at least one of composition processing of combining a plurality of images, processing of geometrically transforming an image, and processing of superimposing an image and drawing data;
wherein the detection processing uses a detection model trained thorough machine learning.

3. The information processing apparatus according to claim 2, wherein the processing of superimposing the image and the drawing data is processing of generating an image in which drawing data according to design information about the structure and a portion corresponding to the drawing data in the image are superimposed.

4. The information processing apparatus according to claim 1,
wherein the detection processing is processing of detecting a crack appearing in the structure as the deformation from the image of the structure and superimposing information about the detected crack and the image, and
wherein the at least one processor processes a third image generated through the detection processing, using information about the detection processing.

5. The information processing apparatus according to claim 4, wherein the at least one processor uses information about image-capturing that is the metadata of the first image, for selecting the detection model, in the detection processing.

6. The information processing apparatus according to claim 1, wherein the second image is generated in a data format different from a data format of the first image, in the composition processing.

7. The information processing apparatus according to claim 1, wherein the at least one processor
displays the second image on a display unit,
receives a user operation of designating a portion of the displayed second image, and
identifies an image corresponding to the portion of the second image designated by the user operation, based on the user operation and the metadata of the first image and the other image.

8. The information processing apparatus according to claim 1, wherein the at least one processor executes the image processing on the second image, using the metadata of the first image, the metadata of the other image, and the metadata of the second image.

9. A non-transitory storage medium storing a program that causes an information processing apparatus for a system of inspecting a structure for a deformation on the structure using an image to execute
acquisition processing of acquiring a first image and another image, the first image and the other image being each an image of the structure captured by an imaging apparatus;
composition processing of combining the first image and the other image to generate a second image;
acquisition processing of acquiring information about image-capturing of the first image as metadata of the first image and information about image-capturing of the other image as metadata of the other image;
generation processing of generating metadata of the second image; and
image processing on the second image using the metadata of the first image and the metadata of the second image,
wherein the image processing includes detection processing of detecting the deformation on the structure from the image of the structure.

10. The non-transitory storage medium according to claim 9, wherein the image processing further includes at least one of composition processing of combining a plurality of images, processing of geometrically transforming an image, and processing of superimposing an image and drawing data;
wherein the detection processing uses a detection model trained thorough machine learning.

11. The non-transitory storage medium according to claim 9, wherein the second image is generated in a data format different from a data format of the first image, in the composition processing.

12. The non-transitory storage medium according to claim 9, wherein the information processing apparatus further executes
displaying the second image on a display unit,
receiving a user operation of designating a portion of the displayed second image, and
identifying an image corresponding to the portion of the second image designated by the user operation, based on the user operation and the metadata of the first image and the other image.

13. An information processing method that is executed by one or more information processing apparatuses for a system of inspecting a structure for a deformation on the structure using an image, the information processing method comprising:
executing acquisition processing of acquiring a first image and another image, the first image and the other image being each an image of the structure captured by an imaging apparatus;
executing composition processing of combining the first image and the other image to generate a second image;
executing acquisition processing of acquiring information about image-capturing of the first image as metadata of the first image and information about image-capturing of the other image as metadata of the other image;
executing image processing on the second image using the metadata of the first image and the metadata of the second image,
wherein the image processing includes detection processing of detecting the deformation on the structure from the image of the structure.

14. The information processing method according to claim 13, wherein the image processing further includes at least one of composition processing of combining a plurality of images, processing of geometrically transforming an image, and processing of superimposing an image and drawing data,
wherein the detection processing uses a detection model trained thorough machine learning.

15. The information processing method according to claim 13, wherein the second image is generated in a data format different from a data format of the first image, in the composition processing.

16. The information processing method according to claim 13, further comprising:
displaying the second image on a display unit,
receiving a user operation of designating a portion of the displayed second image, and
identifying an image corresponding to the portion of the second image designated by the user operation, based on the user operation and the metadata of the first image and the other image.

* * * * *